(12) United States Patent
Zhao et al.

(10) Patent No.: US 7,684,639 B2
(45) Date of Patent: Mar. 23, 2010

(54) METHODS AND SYSTEMS FOR AUTOMATIC DIGITAL IMAGE ENHANCEMENT

(75) Inventors: Jie Zhao, Camas, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1189 days.

(21) Appl. No.: 11/255,725

(22) Filed: Oct. 20, 2005

(65) Prior Publication Data

US 2007/0092136 A1  Apr. 26, 2007

(51) Int. Cl.
*G06K 9/40* (2006.01)
(52) U.S. Cl. .................. 382/274; 382/168; 345/617; 348/365; 358/521
(58) Field of Classification Search .................. 382/274
See application file for complete search history.

(56) References Cited

U.S. PATENT DOCUMENTS

| | | | | | |
|---|---|---|---|---|---|
| 5,060,290 | A | * | 10/1991 | Kelly et al. | 382/110 |
| 5,224,177 | A | * | 6/1993 | Doi et al. | 382/168 |
| 5,414,538 | A | * | 5/1995 | Eschbach | 358/522 |
| 5,426,517 | A | | 6/1995 | Schwartz | |
| 5,450,502 | A | * | 9/1995 | Eschbach et al. | 382/169 |
| 5,473,373 | A | * | 12/1995 | Hwung et al. | 348/254 |
| 5,563,962 | A | * | 10/1996 | Peters et al. | 382/261 |
| 5,581,370 | A | | 12/1996 | Fuss et al. | |
| 5,588,071 | A | | 12/1996 | Schultz | |
| 5,727,080 | A | * | 3/1998 | Cox et al. | 382/168 |
| 5,734,740 | A | * | 3/1998 | Benn et al. | 382/132 |
| 5,751,848 | A | * | 5/1998 | Farrell | 382/172 |
| 5,828,793 | A | * | 10/1998 | Mann | 382/284 |
| 5,835,628 | A | * | 11/1998 | Farrell | 382/168 |
| 5,848,183 | A | * | 12/1998 | Farrell | 382/172 |
| 5,949,918 | A | * | 9/1999 | McCaffrey | 382/274 |
| 6,249,602 | B1 | * | 6/2001 | Michael et al. | 382/168 |
| 6,393,148 | B1 | | 5/2002 | Bhaskar | |
| 6,579,239 | B1 | | 6/2003 | Avinash et al. | |
| 6,664,973 | B1 | * | 12/2003 | Iwamoto et al. | 345/589 |
| 6,757,442 | B1 | | 6/2004 | Avinash | |
| 6,778,183 | B1 | * | 8/2004 | Nair et al. | 345/589 |
| 6,781,715 | B1 | | 8/2004 | Nakajima et al. | |
| 6,912,307 | B2 | | 6/2005 | Spitzer et al. | |
| 6,917,708 | B2 | * | 7/2005 | Goodman et al. | 382/186 |
| 7,027,088 | B1 | * | 4/2006 | Kuwata et al. | 348/234 |
| 7,034,843 | B2 | * | 4/2006 | Nair et al. | 345/589 |
| 7,042,464 | B1 | * | 5/2006 | Paquette | 345/601 |
| 7,113,648 | B1 | * | 9/2006 | Aihara | 382/274 |
| 7,127,123 | B2 | * | 10/2006 | Wredenhagen et al. | 382/274 |
| 7,218,344 | B2 | * | 5/2007 | Cooper | 348/223.1 |
| 7,221,807 | B2 | * | 5/2007 | Campbell | 382/274 |
| 7,355,606 | B2 | * | 4/2008 | Paquette | 345/589 |
| 7,400,363 | B2 | * | 7/2008 | Suga et al. | 348/687 |
| 7,424,148 | B2 | * | 9/2008 | Goh | 382/169 |
| 7,483,187 | B2 | * | 1/2009 | Bochkarev | 358/519 |
| 7,573,533 | B2 | * | 8/2009 | Moldvai | 348/678 |
| 7,593,591 | B2 | * | 9/2009 | Achong et al. | 382/274 |
| 2002/0171852 | A1 | * | 11/2002 | Zhang et al. | 358/1.9 |

(Continued)

OTHER PUBLICATIONS

Sakaue, S., Nakayama, M., Tamura, A., Maruno, S., "Adaptive gamma processing of the video cameras for the expansion of the dynamic range", Consumer Electronics, IEEE Transactions on, Aug 1995, vol. 41, Issue: 3, pp. 555-562, ISSN: 0098-3063.*

(Continued)

*Primary Examiner*—Sath V Perungavoor
(74) *Attorney, Agent, or Firm*—Krieger Intellectual Property, Inc; Scott C. Krieger

(57) ABSTRACT

Embodiments of the present invention comprise systems, methods and devices for digital image contrast enhancement.

4 Claims, 6 Drawing Sheets

U.S. PATENT DOCUMENTS

| | | | |
|---|---|---|---|
| 2003/0012414 A1 | 1/2003 | Luo | |
| 2003/0035156 A1* | 2/2003 | Cooper | 358/516 |
| 2004/0057061 A1* | 3/2004 | Bochkarev | 358/1.9 |
| 2005/0069278 A1* | 3/2005 | Akahori | 386/4 |
| 2005/0100242 A1 | 5/2005 | Trifonov | |
| 2005/0146520 A1* | 7/2005 | Ikeda | 345/204 |
| 2006/0002583 A1* | 1/2006 | Reed et al. | 382/100 |
| 2006/0082689 A1* | 4/2006 | Moldvai | 348/678 |
| 2006/0239581 A1* | 10/2006 | Neuman | 382/274 |
| 2007/0014470 A1* | 1/2007 | Sloan | 382/162 |
| 2007/0031059 A1* | 2/2007 | Achong et al. | 382/274 |
| 2007/0092136 A1* | 4/2007 | Zhao et al. | 382/169 |
| 2007/0092137 A1* | 4/2007 | Zhao et al. | 382/169 |
| 2008/0266240 A1* | 10/2008 | Chen et al. | 345/102 |

OTHER PUBLICATIONS

Charles Poynton, A Technical Introduction to Digital Video, John Wiley & Sons, 1996. *Chapter 6, available at http://www.poynton.com/PDFs/TIDV/Gamma.pdf*.

Rafael, G. Gonzalez, Digital Image Processing, Addison-Wesley Publishing, 1992, *P173-178 and 182-183*.

S. Yang, and Y. Park, "Contrast enhancement using histogram equalization with bin underflow and bin overflow," Proc. Int. Conf. Image Processing, vol. 1, pp. I-881-884, Sep. 2003.

S.D. Chen and A. Ramli, "Minimum mean brightness error bi-histogram equalization in contrast enhancement," IEEE Trans. Consumer Electron., vol. 49, No. 4, pp. 1310-1319, Nov. 2003.

S. Y. Kim, and D. Han, "Image contrast enhancement based on the piecewise-linear approximation of CDF,", IEEE Trans. Consumer Electron., vol. 45, pp. 828-834, Aug. 1999.

S. Sakaue, A. Tamura, M. Nakayama, and S. Maruno, "Adaptive gamma processing of the video cameras for the expansion of the dynamic range," IEEE Trans. Consumer Electron., vol. 41, pp. 555-562, Aug. 1995.

J. A. Stark, "Adaptive image contrast enhancement using generalizations of histogram equalization," IEEE Trans. Image Processing, pp. 889-896, May 2000.

J. Kim, L. Kim, and S. Hwang, "An advanced contrast enhancement using partially overlapped sub-block histogram equalization," IEEE Trans. on Circuits and Systems for Video Technology, vol. 11, No. 4, pp. 475-484, Apr. 2001.

* cited by examiner

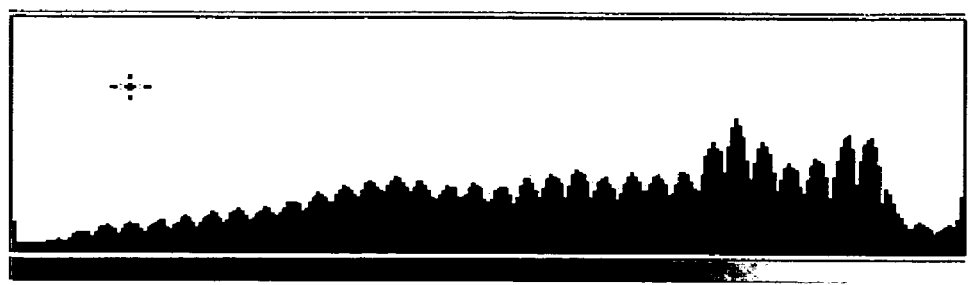
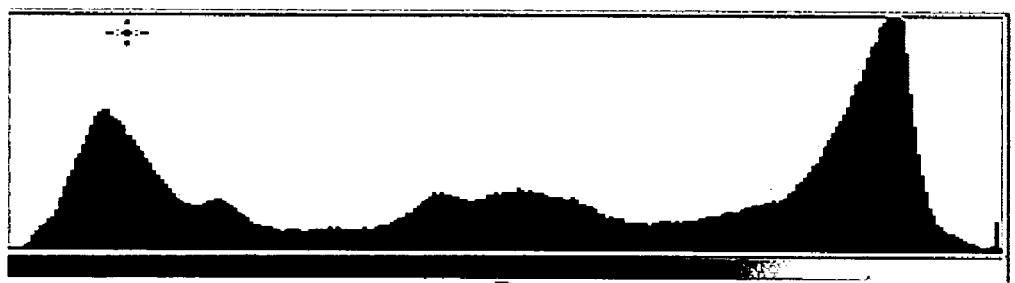
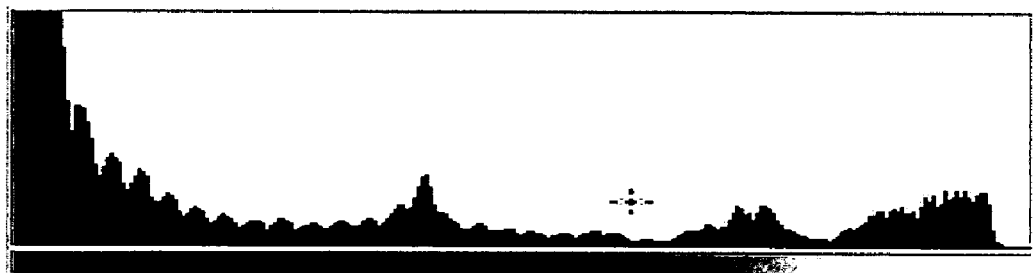
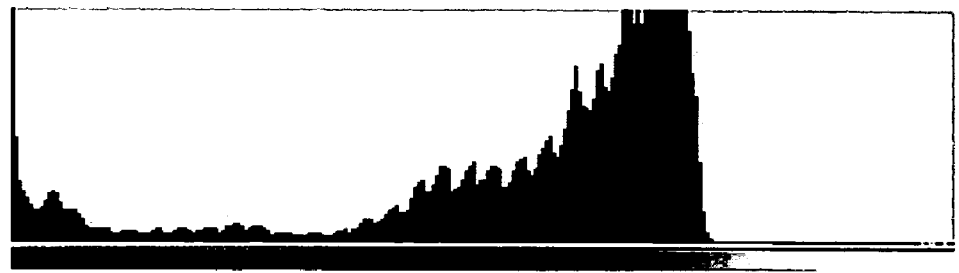
FIG. 1

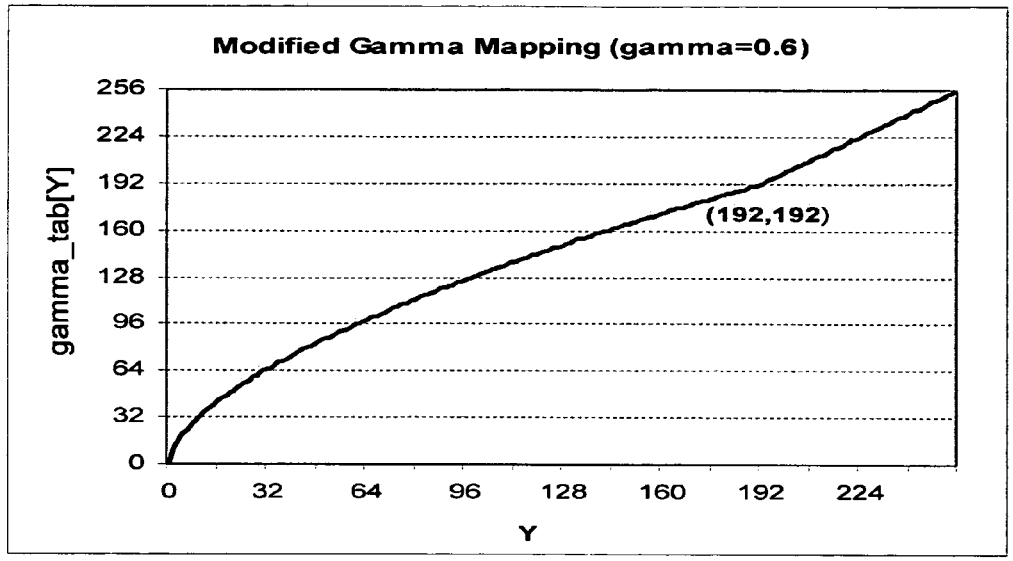

FIG. 3

```
assign (0,0) to the first pivot point;
accumulated_histogram = 0;
this_pivot_point = 1;
for (actual_Y=0; actual_Y<=255; actual_Y++)
{
    accumulated_histogram += histogram[actual_Y];
    if (accumulated_histogram >= target_count[this_pivot_point])    41
    {
        target_Y = 256*target_percent[this_pivot_point];
        if (target_Y < actual_Y) target_Y = actual_Y;          // **
        if (Type-D picture)   map_Y = actual_Y + brightness_offset;     42
        else   map_Y = w*target_Y + (1-w)*gamma_tab[actual_Y];
        clip map_Y into the range of [0-255];                   43
        assign (actual_Y, map_Y) to this pivot point;
        this_pivot_point++;                                44
        if (this_pivot_point > total_movable_pivot_points) STOP;
    }
}
assign (255, 255) to the last pivot point.
```
⎫
⎬ 40
⎭

FIG. 4

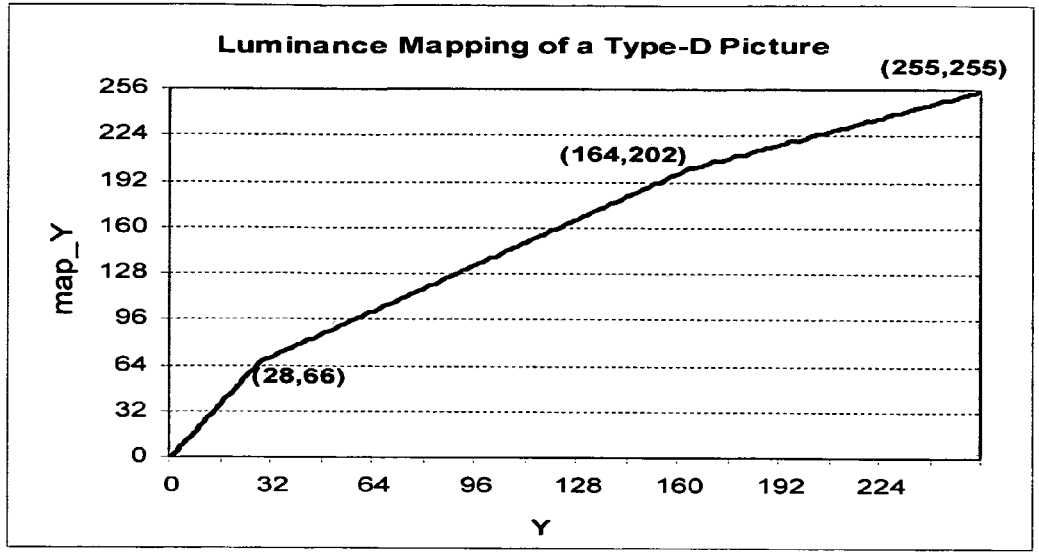

FIG. 7

```
assign (0,0) to the first pivot point;
accumulated_histogram = 0;
this_pivot_point = 1;
for (actual_Y=0; actual_Y<=Ymax; actual_Y+=local_histogram_bin_stepsize)
{
    accumulated_histogram += local_histogram_bin[actual_Y];
    if (accumulated_histogram >= target_percent[this_pivot_point]*sub_block_pixels)
    {
        map_Y = (Ymax+1)*target_percent[this_pivot_point];
        if (map_Y < actual_Y) map_Y = actual_Y;            // **
        assign (actual_Y, map_Y) to this pivot point;
        this_pivot_point++;
        if (this_pivot_point > total_movable_pivot_points) STOP;
    }
}
assign (Ymax, Ymax) to the last pivot point.
```

FIG. 8

METHODS AND SYSTEMS FOR AUTOMATIC DIGITAL IMAGE ENHANCEMENT

FIELD OF THE INVENTION

Embodiments of the present invention comprise methods and systems for automatically enhancing the contrast and other attributes of digital images.

BACKGROUND OF THE INVENTION

The quality of a digital image may be affected by the light conditions at the time of image capture, the quality of the capture device and the skill of the person capturing the image. As a result of these and other factors, digital images often suffer from poor contrast and other problems in one or more areas of the image. In some cases, the lightest area of the image is "washed-out" from over-exposure, incorrect capture device settings or other reasons. In other cases, a dark area of the image is "blacked-out" from under-exposure, incorrect capture device settings or other reasons. In these and other cases, portions of the image suffer from poor contrast as some image values are not perceptible to the human observer.

Some manual methods exist for adjusting the level, brightness, contrast or other attributes of an image to improve these types of problems. However, these methods typically require a user to select the proper tool and demonstrate some degree of skill in applying the tool to an image. Often, image contrast in one area is improved only at a cost of image degradation in another area.

Some automated methods for image contrast enhancement also exist. Histogram equalization is a popular method for contrast enhancement because of its effectiveness and relative simplicity. Histogram equalization may be classified into two groups based on the transformation function used: Global histogram equalization uses a global transformation function for the entire image. Global methods are fast and simple, but their contrast-enhancement power is relatively low. Global methods cannot adapt to local brightness features of an image because only global histogram information is used over the image. Local histogram equalization generally can enhance overall contrast effectively, but the complexity of computation is high due to the use of fully overlapped sub-blocks.

One method of local histogram equalization uses block-overlapped histogram equalization. In this method, a rectangular sub-block of an input image is selected and a histogram of that sub-block is determined. A histogram-equalization function is then calculated for that sub-block. The center pixel of the sub-block is then moved, thereby defining a new sub-block, and the computation is performed again with a new histogram and equalization function. The procedure is repeated for each pixel in the image. Obviously, the computation complexity is very high relative to a global method.

BRIEF SUMMARY OF THE INVENTION

Embodiments of the present invention comprise systems, methods and devices for automatically enhancing contrast and other characteristics of an image.

Some embodiments of the present invention comprise determination of an image histogram, classification of the image based on histogram characteristics and enhancement of the image with classification-specific methods.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a diagram showing image histograms corresponding to exemplary image types;

FIG. 3 is a chart showing an exemplary gamma correction curve;

FIG. 4 shows exemplary pseudo code for generating a global luminance map;

FIG. 7 is an exemplary luminance map for a Type D image;

FIG. 8 shows exemplary pseudo code for generating a local luminance map; and

DETAILED DESCRIPTION

Figure 2:
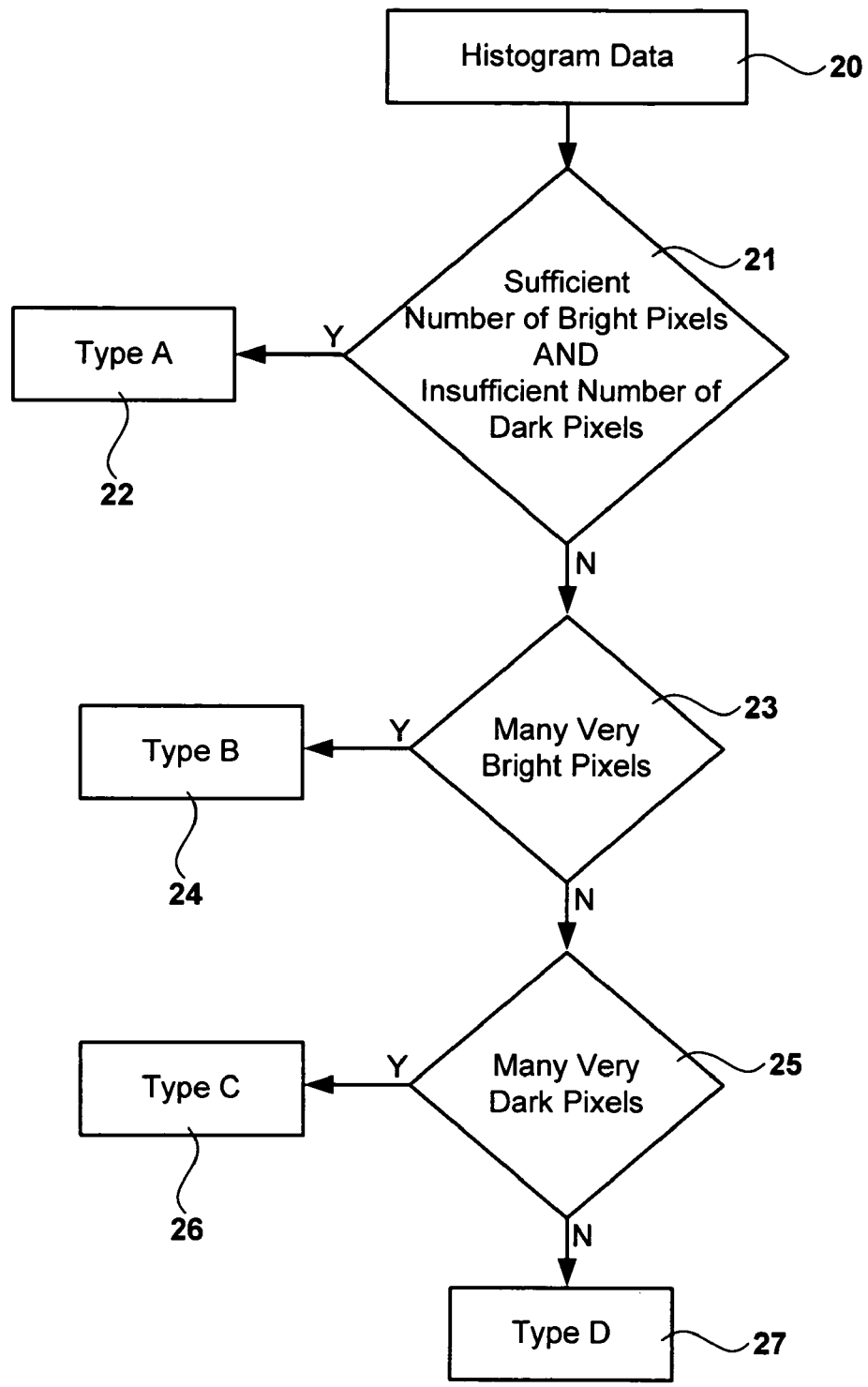
FIG. 2 is a flow chart showing exemplary image classification methods.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise a digital image enhancement method that is capable of enhancing dark images or dark portions of an image. In these embodiments a histogram analysis is performed on the entire image. The global histogram is then classified as one of a fixed set of image/histogram types. A global mapping algorithm may then be calculated for the luminance channel. This may be a piecewise linear mapping. Pivot points in the piecewise linear map may be determined by a process which is a combination of histogram equalization and gamma correction. Linear mapping between pivot points makes the map easy to calculate. Look-up tables may be easily generated on-the-fly making the method suitable for digital cameras and other devices with limited processing power. In some embodiments, no change is made to the chrominance channels during enhancement.

Some embodiments of the present invention comprise a characterization method comprising performing a histogram analysis of the luminance channel of an image and characterizing or classifying the image according to histogram characteristics. Empirical thresholds may be used to classify the image. In some embodiments, images may be classified as one of a finite set of image types. In an exemplary embodiment, shown in FIGS. 1A-1D, four types are used.

Exemplary image type A, shown in FIG. 1A, comprises a sufficient number of "bright" pixels, but not many "dark"

pixels. These are considered "normal" images and adjustment of these images may be omitted.

Exemplary image type B, shown in FIG. 1B, comprises a high number of "bright" pixels and a high number of "dark" pixels with fewer pixels in the midrange. Images with this type of polarized pattern may benefit from an image enhancement that enhances the dark pixels, but leaves the brighter pixels unmodified. This type of image may occur when the main object of an image is dark while the background is very bright.

Exemplary image type C, shown in FIG. 1C, comprises a low number of "bright" pixels and a high number of "dark" pixels. Images with this type of "predominantly dark" pattern may benefit from an image enhancement that stretches the dark pixels levels and compresses the other pixel levels.

Exemplary image type D, shown in FIG. 1D, comprises a high number of mid-range pixels and a relatively low number of dark and bright pixels. Images with this type of "mid-range" pattern may benefit from an image enhancement that increases the brightness of mid-range pixels, stretches the very dark pixel levels and compresses the very bright pixel levels. A brightness offset may be determined by accumulating pixels from the high end of the histogram until reaching a specified small percentage of pixels. A difference between the luminance value reached when this percentage has accumulated and the max luminance value, e.g. 255 for 8-bit images, or part of this difference, can be used as a brightness offset. The brightness offset may be used to generate a luminance mapping.

In some embodiments of the present invention, an image may be classified as a specific image type according to the chart shown in FIG. 2. In these embodiments, image histogram data is analyzed. In this analysis, a first determination 21 is made to determine if a first condition is met wherein a sufficient number of bright pixels exist and an insufficient number of dark pixels exist. If this first condition is met, the image is classified as a "Type A" image 22.

If this first condition is not met, a second determination 23 may be made to determine if a second condition is met wherein many very bright pixels are present in the image. If this condition is met, the image is classified as a "Type B" image 24.

If the second condition is not met, a third determination 25 may be made to determine if a third condition is met wherein many very dark pixels are present in the image. If this condition is met, the image is classified as a "Type C" image 26. If this condition is not met, along with the first and second conditions, the image is classified as a "Type D" image 27.

In some exemplary embodiments of the present invention, a luminance histogram may comprise eight equal-sized bins. In other exemplary embodiments, a luminance histogram used to characterize or classify an image may comprise a number of bins between 4 and 20.

In some of these embodiments, a sufficient number of bright pixels, as determined for the first determination 21, may exist when the top $3/8$ of the bins of the histogram hold more than 40% of the pixels. In other exemplary embodiments, this condition may be met when the top $1/8$ to $1/2$ of the bins holds more than 30% to 50% of the total pixels in the image.

In some of these embodiments, an insufficient number of dark pixels, as determined for the first determination 21, may exist when two conditions are met: a) the percentage of the bottom $1/8$ bin is less than 10% of the total number of pixels and b) the percentage of the bottom $1/8$ to $3/8$ of the bins is less than 20% of the total number of pixels. In other exemplary embodiments, this condition may be met when the bottom $1/16$ to $1/4$ bins simply contains less than 5% to 15% of the image pixels. In other exemplary embodiments, this condition may be met when the bottom $1/8$ to $3/8$ of the bins simply contain less than 10% to 30% of the image pixels. In other exemplary embodiments, this condition may be met when two conditions are met: a) the percentage of the bottom $1/16$ to $1/4$ bins is less than 5% to 15% of the total number of pixels and b) the percentage of the bottom $1/8$ to $3/8$ bins is less than 10% to 30% of the total number of pixels.

In some of these embodiments, the condition of many very bright pixels being present, as determined for the second determination 23, may exist when two conditions are met: a) the percentage of the top bin is not less than 6.25% and b) the percentage of the top two bins is not less than 12.5%. In other exemplary embodiments, this condition may be met when the top $1/16$ to $1/4$ of the bins simply contains not less than 2.5% to 12.5% of the image pixels. In other exemplary embodiments, this condition may be met when the top $1/8$ to $3/8$ of the bins simply contain not less than 6% to 18% of the image pixels. In other exemplary embodiments, this condition may be met when two conditions are met: a) the percentage of the top $1/16$ to $1/4$ of the bins is not less than 2.5% to 12.5% of the total number of pixels and b) the percentage of the top $1/8$ to $3/8$ of the bins is not less than 6% to 18% of the total number of pixels.

In some of these embodiments, the condition of many very dark pixels being present, as determined for the third determination 25, may exist when a condition is met wherein the percentage of the bottom two bins is not less than 20%. In other exemplary embodiments, this condition may be met when the bottom $1/8$ to $3/8$ of the bins simply contain not less than 10% to 30% of the image pixels.

Other embodiments of the present invention may comprise other combinations of histogram bin values and pixel percentages outside the specific numeric values and numeric ranges described above, but within the textual description of the conditions.

Global Luminance Mapping

Many luminance mapping methods may be used in embodiments of the present invention. In some exemplary embodiments, mapping may be done in a YUV color space. In some of these exemplary embodiments, mapping may be performed only on the luminance, Y, channel.

In some embodiments, luminance mapping may be performed using a piecewise linear map comprising a plurality of continuous linear relationships. These linear relationships may be represented by a few pivot points. With piecewise linear mapping, one can easily calculate a pixel level look-up table on the fly. In embodiments of the present invention, pivot points may be spaced along a vertical (output) axis. Since the output is histogram equalized, spacing along this axis is usually well behaved, while spacing along the input axis may have collapsed pivot points if there are no pixel values falling between two pivot points.

In some embodiments, the start point of a first linear relationship can be fixed at the origin, at point (0,0). In some embodiments, the end point of the last linear relationship is a maximum value point (e.g., 255,255 for an 8-bit image). Other, adjustable pivot points in the piecewise linear relationships may be chosen to ensure that all lines monotonically increase. These points may be determined based on the principle of histogram equalization or by other methods. The intermediate or adjustable pivot points may be spaced out along the vertical (output) axis of the mapping curve. In some embodiments, a target percentage of total pixels may be specified to determine each pivot point. The highest pivot point may be referred to as the "bright pivot point." Pixels above the bright pivot point may be classified as "bright pixels."

In an exemplary luminance map embodiment, 4 pivot points may be selected in addition to the start point at (0,0), and the end point at (255,255). Targeted percentages for the pivot points may be selected as 10%, 25%, 50% and 75% or other values that are spread throughout the percentage range. In this case, the point corresponding to 75% may be considered the "bright pivot point." In other embodiments, other percentage values may be specified.

The Y-coordinate of a pivot point, denoted as mapped_Y[i] (i.e., the mapped luminance value), can be then straightforwardly calculated by $$\text{mapped\_}Y[i] = Y\text{max} * \text{target\_percent}[i], \quad (1)$$

where i is the pivot-point index and target_percent[i] denotes the target percentage for the pivot point i.

Based on the principle of histogram equalization, the X-coordinate of a pivot point should be the least luminance value at which the accumulated histogram reaches its target percentage. Hence, to calculate the X-coordinate of a pivot point, we first calculate the target count of the pivot point, denoted as target_count[i]:

$$\text{target\_count}[i] = \text{target\_percent}[i] * \text{total\_pixels}, \quad (2)$$

where total_pixels denotes the total number of pixels.

The X-coordinate of the pivot point i, denoted as actual_Y[i] (i.e., the actual or original luminance value), can be determined as follows:

actual_Y[i] = the minimal k such that $$\sum_{j=0}^{k} \text{histogram}[j] > \text{target\_count}[i], \quad (3)$$

where histogram[j] is the number of pixels with value j.

Thus, the coordinates of the pivot point i can be denoted as (actual_Y[i], mapped_Y[i]). To avoid mapping lines going up too fast and to better preserve the natural look of the images, the slopes of the mapping lines can be regulated by selected maximum slopes. To facilitate fast conversion of luminance values, a mapping look-up table can be calculated by linear interpolation between adjacent pivot points.

Global Luminance Mapping with Gamma Adjustment

In some embodiments of the present invention, a different luminance map may be generated for some of the image types identified in the image classification processes described above or for image types classified by other methods.

In some embodiments, for a Type B image, with many very bright pixels, the levels above the bright pivot point may be preserved. This may be achieved by setting the target count for a pivot point equal to the difference between the total number of pixels and the number of bright pixels multiplied by the target percentage for the pivot point divided by a quantity equal to the bright pivot point percentage. This modification will tend to preserve the levels above the bright pivot point. In these embodiments, the target count for a pivot point, for a Type C or Type D image, may be calculated as the target percentage for the pivot point multiplied by the total number of pixels.

Once the initial pivot points have been determined, adjusted, mapped pivot points may be calculated by applying a gamma adjustment curve. An exemplary gamma adjustment curve may be generated using the following equations:

$$\text{gamma\_tab}[Y] = \text{bright\_threshold} * \left(\frac{Y}{\text{bright\_threshold}}\right)^{gamma}$$

if $0 \leq Y < \text{bright\_threshold}$ $\text{gamma\_tab}[Y] = Y$ if $\text{bright\_threshold} \leq Y \leq 255$ Using these exemplary equations, when gamma is less than 1, the gamma adjustment will brighten pixels below the bright pivot point and preserve those above that point. In some embodiments, good results are obtained with a gamma value of 0.6 and a bright pivot point at 192. An exemplary gamma adjustment curve generated with these values is shown in FIG. 3.

Once the gamma adjustment curve is generated, it may be applied to a luminance map using a weighting factor. Adjusted, mapped luminance values may be obtained by a weighted average of the luminance mapped values and the gamma curve values. The pseudo code example, depicted in FIG. 4, uses a weighting value, w, that may range from 0 to 1.

In the exemplary method depicted in FIG. 4, wherein pseudo code 40 is used to describe these embodiments, some optional steps are included. A first optional step 41 is used to ensure that the mapped luminance value does not fall below the original input value thereby maintaining overall image brightness. A second optional step 42 is also shown wherein a brightness offset is used to preserve higher luminance values in a specific type of image (Type D). Another optional step 43 is used to apply a weighting factor and adjust the relative weight of the initial luminance map and the gamma curve in the adjusted map values. Yet another optional step 44 may be used to clip adjusted map values to the proper range. In some embodiments, other methods may be used to force adjusted values that have been adjusted out of range into the proper range.

In some embodiments of the present invention, a further restriction may be placed on the adjusted values. In these embodiments, a maximum slope limit may be applied to ensure that the map's linear segments do not increase too quickly. A different slope limitation may be applied to each segment of the piecewise linear relationship. Pivot points may be adjusted downward until this limitation is satisfied.

After selected adjustments, described above, have been applied and final pivot points have been calculated, a pixel level mapping look-up table may be generated by linearly interpolating between adjacent pivot points.

Figure 5:
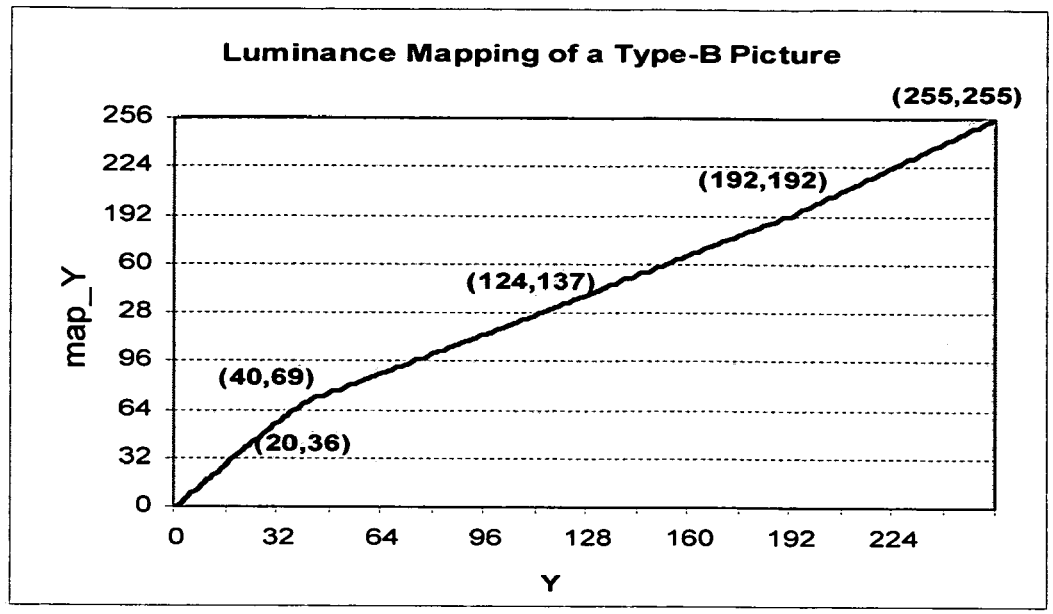
FIG. 5 is an exemplary luminance map for a Type B image.
Figure 6:
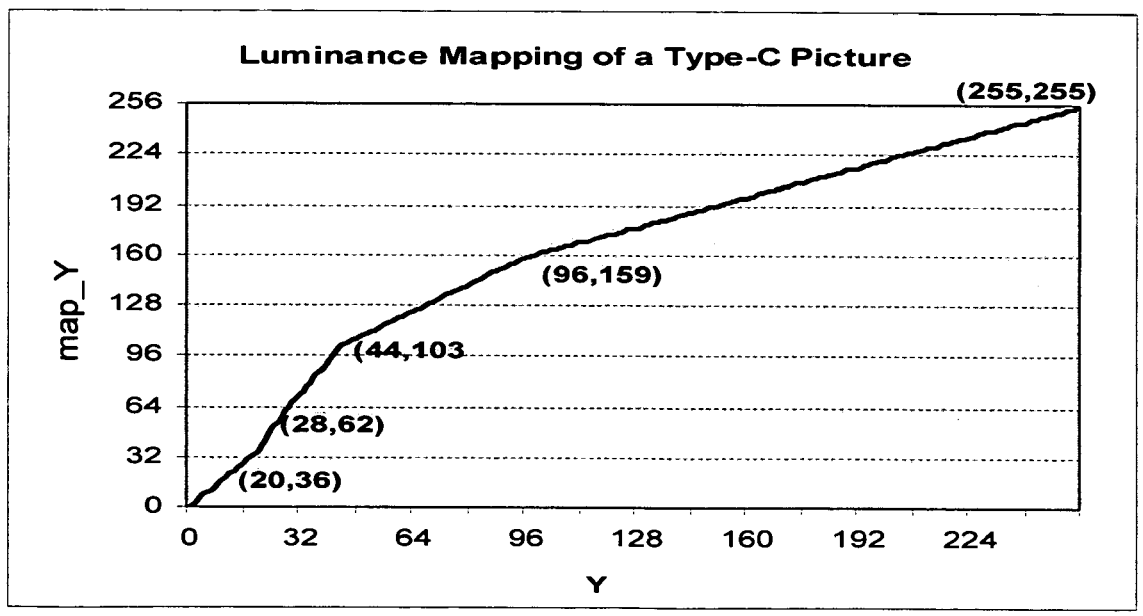
FIG. 6 is an exemplary luminance map for a Type C image.

An exemplary final luminance map for a typical Type B image is shown in FIG. 5. An exemplary final luminance map for a typical Type C image is shown in FIG. 6. An exemplary final luminance map for a typical Type D image is shown in FIG. 7.

Local Adjustment/Enhancement

Some embodiments of the present invention may comprise local enhancement, wherein a local block mapping curve for each non-overlapped block may be calculated in a way similar to the global enhancement methods described above, but using a local or block histogram, instead of the global histogram, to calculate the pivot points.

In some local enhancement embodiments, an image may be divided into many non-overlapped blocks. For example, for a 2M-pixel image with width 1632 pixel and height 1224 pixel, the image may be divided into a 16×12 grid of blocks.

Each block's size is 102 by 102 pixels. In a one-pass histogram analysis, both global and local histograms may be obtained.

In some embodiments, local adjustment curves may be determined. Local luminance mapping may be determined in a way similarly to the global mapping described above. In some embodiments, it may be performed in the YUV color space, and may be performed only on the luminance channel—Y. For each block, the mapping curve may comprise several continuous piecewise linear lines, which may be referred to as a block mapping curve and which can be summarized by a few pivot points. Typically, the starting point (0,0) and the ending point (Ymax,Ymax) are included as the first and the last pivot points, where Ymax is the maximum value for luminance signal, e.g., Ymax=255 for 8-bit images. The other pivot points are chosen to make sure all lines monotonically increase. A target percentage of total pixels may be specified to determine each pivot point. For example, not including (0,0) and (Ymax, Ymax), we may choose 4 pivot points with targeted percentages of 10%, 25%, 50% and 75% respectively. The pivot points may be determined by a histogram equalization-like procedure similar to those described above in relation to global methods. The pseudo code for an exemplary embodiment for determining the coordinates of the pivot points is shown in FIG. 8. These embodiments comprise a slightly simpler method than those described in relation to global enhancement, however the same methods used in the described global embodiments may be applied to local enhancement.

In some embodiments, the local mapped luminance value may be obtained by interpolation. Due to the difference among local mapping curves of neighboring blocks, if all pixels inside a block are mapped by only using this block's own local mapping curve, blocking artifacts would often occur at block boundaries. To avoid blocking artifacts, the local mapped luminance value of a pixel may be calculated by interpolating the mapping curves of its four nearby blocks.

Figure 9:
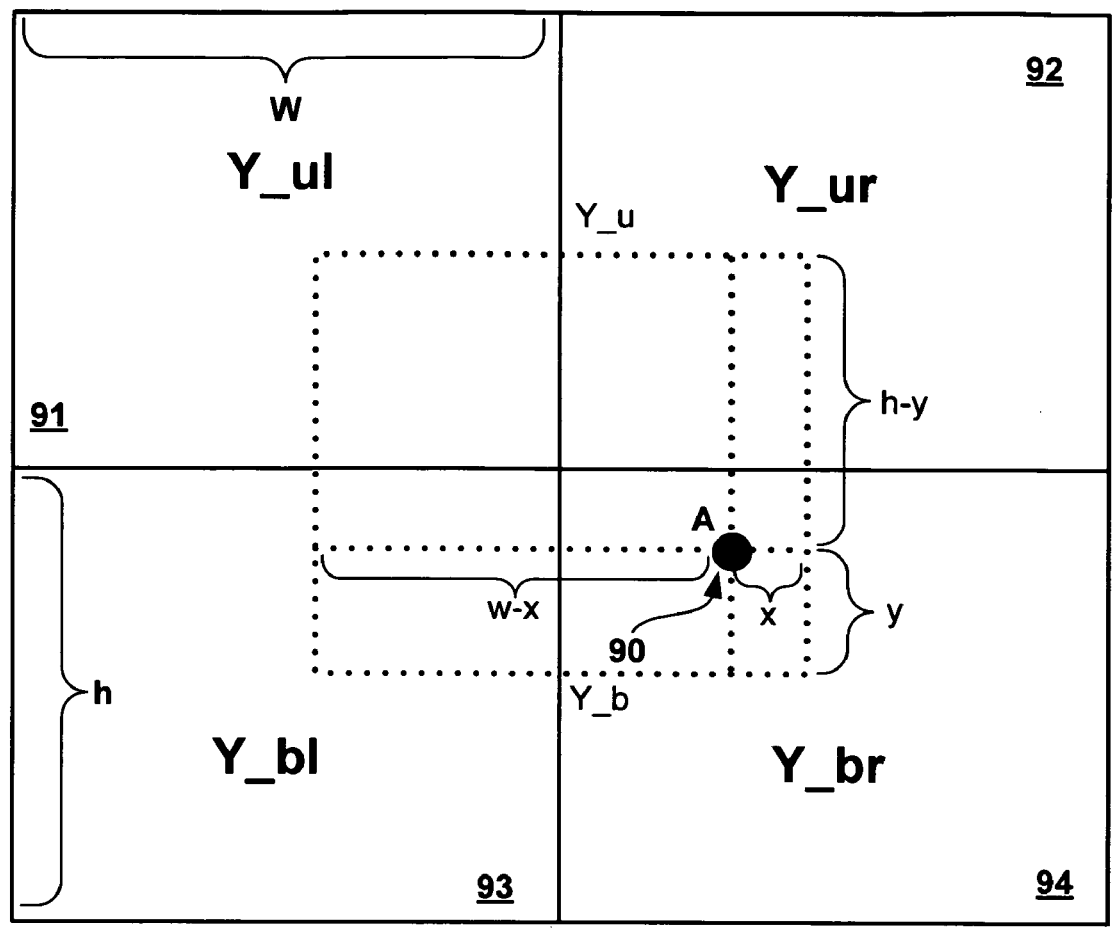
FIG. 9 is a diagram showing an exemplary luminance map averaging method.

An exemplary interpolation method is depicted in FIG. 9. In these embodiments, pixel A 90 has four nearby blocks 91-94. We first obtain the four mapped values of its original luminance value by the block mapping curves of those four nearby blocks. We denote these four mapped values as Y_ul, Y_ur, Y_bl, and Y_br for the upper left, the upper right, the bottom left and the bottom right blocks respectively. Let x and y denote, respectively, the horizontal and vertical distances from the pixel A to the center of its block, which is the bottom right block in this case. Let w and h denote the width and height of a block, respectively. Use Y_u and Y_b to denote the horizontally interpolated values of the upper two blocks and the lower two blocks. Then the final mapped value of the pixel A for local enhancement, denoted as local_Y, can be calculated by a weighted sum of Y_ul, Y_ur, Y_bl, and Y_br with weights inversely proportional to distances, namely:

$$Y\_u=Y\_ul*x/w+Y\_ur*(1-x/w)$$

$$Y\_b=Y\_bl*x/w+Y\_br*(1-x/w)$$

$$local\_Y=Y\_u*y/h+Y\_b*(1-y/h) \quad (4)$$

The effect of the interpolation of Y_ul, Y_ur, Y_bl, and Y_br is equivalent to using an interpolation of four nearby block mapping curves to map the original luminance value of the pixel A. This mapping-curve interpolation effectively avoids any blocking artifacts. Hence no de-blocking filter is needed and the blur usually caused by the de-blocking filter can also be avoided.

Combined Global and Local Enhancement

Some embodiments of the present invention may comprise a local adjustment skipping method. Compared to global adjustment, local adjustment is relatively expensive in terms of complexity. To lower the complexity, local adjustment can be skipped when it is not necessary. The local-adjustment skip may be done on both the picture level and the block level. In order to determine the necessity of local adjustments, a local property about the darkness of each block may be acquire. The term "dark block" may refer to a block in which the majority of pixels are darker than a threshold value.

For some picture-level local-adjustment skipping embodiment, the local adjustment for entire image may be skipped when the picture has a total number of dark blocks greater than a specified threshold. For this kind of image, since there are a lot of dark blocks, the dark block histograms would be sufficiently represented in the histogram of the global image. Hence, global adjustment alone would be sufficient and the expensive local adjustments can be skipped.

For block-level, local-adjustment skipping embodiments, the local adjustment may be applied only to the dark blocks and the pixels near the dark blocks. Local adjustment curves may be obtained for dark blocks only, and the interpolations are performed for the dark blocks and their neighboring pixels in order to avoid blocking artifacts. For the rest of pixels in non-dark blocks, only global adjustments are performed. In the interpolation step, if a neighboring block's local mapping curve does not exist, the global mapping curve may be used. This will make a smooth transition between the blocks with local adjustment and those without local adjustment, thereby making a seamless integration of the global and the local enhancements. Since local enhancement is only performed on a small number of blocks in the image, the complexity increase due to local enhancement is limited.

In some embodiments, to overcome the over-enhancing problem that often occurs in a local adjustment method, the final mapped value of a pixel may be obtained by the weighted average of its global mapped value and its local mapped value for the blocks with local adjustment. From our experiments, the same weight for the global and the local adjustments gives good results. It achieves the local adaptability, while maintaining the global tone and natural look of an image.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for digital image contrast enhancement, said method comprising:
    a) performing a histogram analysis of an image;
    b) skipping contrast enhancement when said histogram analysis shows that said image comprises a sufficient number of bright pixels and an insufficient number of dark pixels;
    c) performing a first contrast enhancement comprising applying a final luminance map derived from blending a piecewise-linear luminance map with a gamma correction curve when said histogram analysis shows that said image has many very bright pixels;
    d) performing a second contrast enhancement comprising applying a final luminance map derived from blending a piecewise-linear luminance map with a gamma correction curve when said histogram analysis shows that said image has many very dark pixels;

e) performing a third contrast enhancement comprising applying a final luminance map comprising a brightness offset when said histogram analysis shows that said image does not have many very dark pixels and said image does not have many very bright pixels;

f) wherein said image has a sufficient number of bright pixels when one of the following conditions is met:
  i) the top three histogram bins contain more than 40% of the total pixels in the image, or
  ii) the top ⅛ to ½ of the histogram bins contain more than 30% to 50% of the total pixels in the image; and g) wherein said performing a first, second or third contrast enhancement is performed by a processor and a memory.

2. A method for digital image contrast enhancement, said method comprising:

a) performing a histogram analysis of an image;

b) skipping contrast enhancement when said histogram analysis shows that said image comprises a sufficient number of bright pixels and an insufficient number of dark pixels;

c) performing a first contrast enhancement comprising applying a final luminance map derived from blending a piecewise-linear luminance map with a gamma correction curve when said histogram analysis shows that said image has many very bright pixels;

d) performing a second contrast enhancement comprising applying a final luminance map derived from blending a piecewise-linear luminance map with a gamma correction curve when said histogram analysis shows that said image has many very dark pixels;

e) performing a third contrast enhancement comprising applying a final luminance map comprising a brightness offset when said histogram analysis shows that said image does not have many very dark pixels and said image does not have many very bright pixels;

f) wherein said image has an insufficient number of dark pixels when one of the following conditions is met:
  i) the bottom two histogram bins contain less than 20% of the total image pixels, or
  ii) the bottom ⅛ to ⅜ of the histogram bins contain less than 10% to 30% of the total image pixels;

g) wherein said performing a first, second and third contrast enhancement is performed by a processor and a memory.

3. A method for digital image contrast enhancement, said method comprising:

a) performing a histogram analysis of an image;

b) skipping contrast enhancement when said histogram analysis shows that said image comprises a sufficient number of bright pixels and an insufficient number of dark pixels;

c) performing a first contrast enhancement comprising applying a final luminance map derived from blending a piecewise-linear luminance map with a gamma correction curve when said histogram analysis shows that said image has many very bright pixels;

d) performing a second contrast enhancement comprising applying a final luminance map derived from blending a piecewise-linear luminance map with a gamma correction curve when said histogram analysis shows that said image has many very dark pixels;

e) performing a third contrast enhancement comprising applying a final luminance map comprising a brightness offset when said histogram analysis shows that said image does not have many very dark pixels and said image does not have many very bright pixels;

f) wherein said image has many very bright pixels when one of the following conditions is met:
  i) the top histogram bin contains more than 6.25% of the total image pixels and the top two histogram bins contain more than 12.5% of the total image pixels, or
  ii) the top 1/16 to ¼ of the histogram bins contain more than 2.5% to 12.5% of the total image pixels; and g) wherein said performing a first, second or third contrast enhancement is performed by a processor and a memory.

4. A method for digital image contrast enhancement, said method comprising:

a) performing a histogram analysis of an image;

b) skipping contrast enhancement when said histogram analysis shows that said image comprises a sufficient number of bright pixels and an insufficient number of dark pixels;

c) performing a first contrast enhancement comprising applying a final luminance map derived from blending a piecewise-linear luminance map with a gamma correction curve when said histogram analysis shows that said image has many very bright pixels;

d) performing a second contrast enhancement comprising applying a final luminance map derived from blending a piecewise-linear luminance map with a gamma correction curve when said histogram analysis shows that said image has many very dark pixels;

e) performing a third contrast enhancement comprising applying a final luminance map comprising a brightness offset when said histogram analysis shows that said image does not have many very dark pixels and said image does not have many very bright pixels; and f) wherein said image has many very dark pixels when one of the following conditions is met:
  i) the bottom two histogram bins contain more than 20% of the total image pixels, or
  ii) the bottom ⅛ to ⅜ of the histogram bins contain more than 10% to 30% of the total image pixels;

g) wherein said performing a first, second or third contrast enhancement is performed by a processor and a memory.

* * * * *